US011129260B2

(12) United States Patent
Magielse et al.

(10) Patent No.: US 11,129,260 B2
(45) Date of Patent: Sep. 21, 2021

(54) LIGHTING SYSTEM CONTROL

(71) Applicant: SIGNIFY HOLDING B.V., Eindhoven (NL)

(72) Inventors: Remeo Magielse, Eindhoven (NL); Leendert Teunis Rozendaal, Eindhoven (NL); Daniel Martin Görgen, Eindhoven (NL); Michel Van De Wetering, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/461,187

(22) PCT Filed: Nov. 7, 2017

(86) PCT No.: PCT/EP2017/078433
§ 371 (c)(1),
(2) Date: May 15, 2019

(87) PCT Pub. No.: WO2018/091310
PCT Pub. Date: May 24, 2018

(65) Prior Publication Data
US 2020/0128653 A1 Apr. 23, 2020

(30) Foreign Application Priority Data

Nov. 15, 2016 (EP) .................................... 16198873

(51) Int. Cl.
*H05B 47/175* (2020.01)
*H05B 47/17* (2020.01)
(Continued)

(52) U.S. Cl.
CPC .......... *H05B 47/175* (2020.01); *G05B 15/02* (2013.01); *H05B 47/115* (2020.01); *H05B 47/16* (2020.01); *H05B 47/17* (2020.01)

(58) Field of Classification Search
CPC ...... H05B 47/17; H05B 47/175; H05B 47/16; H05B 47/105
See application file for complete search history.

(56) References Cited

U.S. PATENT DOCUMENTS

2014/0375222 A1 12/2014 Rains, Jr. et al.
2015/0296594 A1 10/2015 Blum et al.
(Continued)

FOREIGN PATENT DOCUMENTS

WO 2015054611 A1 4/2015
WO 2016050707 A1 4/2016

*Primary Examiner* — Borna Alaeddini

(57) ABSTRACT

A controller for controlling a lighting system, the controller comprising: an interface arranged to communicate with one or more luminaires at a location to be illuminated; a memory arranged to store information, the information comprising a first illumination status of the location, and information of a first command causing the location to adopt the first illumination status; the interface further arranged to receive a second command comprising an instruction for the at least one luminaire to illuminate the location in accordance with a second illumination status which differs from the first illumination status; and a processor configured to determine whether to execute the second command based upon a comparison between a value associated with the first command and a value associated with the second command, the processor configured to calculate the value associated with the first command based upon a priority level value of the first command and a relevance factor associated with the first command, at a time of receiving the second command; and the processor configured to calculate the value associated with the second command based upon a priority level value of the second command.

10 Claims, 9 Drawing Sheets

(51) Int. Cl.
*G05B 15/02* (2006.01)
*H05B 47/115* (2020.01)
*H05B 47/16* (2020.01)

(56) References Cited

U.S. PATENT DOCUMENTS

| | | |
|---|---|---|
| 2016/0037613 A1 | 2/2016 | Laherty et al. |
| 2016/0069585 A1 | 3/2016 | Shrubsole et al. |
| 2016/0072639 A1* | 3/2016 | Magielse ............. H05B 47/105 700/275 |
| 2016/0095189 A1 | 3/2016 | Vangeel et al. |
| 2016/0180617 A1* | 6/2016 | Windridge ............... G07C 9/32 340/5.21 |

\* cited by examiner

LIGHTING SYSTEM CONTROL

CROSS-REFERENCE TO PRIOR APPLICATIONS

This application is the U.S. National Phase application under 35 U.S.C. § 371 of International Application No. PCT/EP2017/078433, filed on Nov. 7, 2017, which claims the benefit of European Patent Application No. 16198873.8, filed on Nov. 15, 2016. These applications are hereby incorporated by reference herein.

The present invention relates to control of lighting systems. More particularly, the present invention relates to the control of lighting systems having multiple inputs.

BACKGROUND

US2016/037613A1 discloses consensus based user control for a lighting system, wherein an average light level is determined based on individual user preferences.

Lighting systems are used for illuminating areas such as rooms, for example in a home, office, factory, or indeed in any other building. Lighting systems may also be used to illuminate outdoor areas. Illumination is provided by a light source, typically one or more light bulbs or LEDs, which may be collectively referred to as luminaires. The luminaires can be controlled by a user, for example by a user turning a light switch off and on. Illumination by the luminaires can also be automatically controlled, for example by operating according to a set routine. Conflicts may arise when a command from one source conflicts with a command from another source, for example a command from a user may conflict with the routine.

STATEMENT OF INVENTION

The present invention provides a lighting system and controller therefore that can selectively determine whether to execute a received command to alter an illumination setting.

In a first aspect there is provided a controller for controlling a lighting system, the controller comprising: an interface arranged to communicate with one or more luminaires at a location to be illuminated; a memory arranged to store information, the information comprising a first illumination status of the location, and information of a first command causing the location to adopt the first illumination status; the interface further arranged to receive a second command comprising an instruction for the at least one luminaire to illuminate the location in accordance with a second illumination status which differs from the first illumination status; and a processor configured to determine whether to execute the second command based upon a comparison between a value associated with the first command and a value associated with the second command, the processor configured to calculate the value associated with the first command based upon a priority level value of the first command and a relevance factor associated with the first command, at a time of receiving the second command; and the processor configured to calculate the value associated with the second command based upon a priority level value of the second command.

Therefore the controller can effectively determine whether a second, or later command should override a first, or earlier command. For example the controller can determine whether a command comprising a user pressing a light switch to turn a light off should override an earlier instruction from a motion detector to turn the light on. In so doing a variable comprising a "relevance factor" is used which determines how relevant the first, earlier command is at the time the second, later command is received. The relevance factor can vary over time, so even though the first command may have a relatively high relevance or importance at the time it is received, by the time the second command is received the relevance of the first command may have diminished to a lower level of relevance. Also used in the determination is a consideration of priority level values of the commands. The priority level values may be based upon a hierarchy of command priority levels.

According to some embodiments determining whether to execute the second command may comprise determining to execute only certain aspects of the second command. For example if the second command comprises multiple aspects (for example brightness and color temperature), then determining whether to execute the second command may comprise implementing only one, or only some, of those aspects.

According to some embodiments, when the determination is made to execute the second command, then the controller may be configured to determine a manner in which the second command is implemented. For example if the second command was an instruction to completely turns lights off from an existing on state, then the controller may in fact determine to dim the lights rather than switch them off completely. This determination may be based upon the comparison between the value associated with the first command and the value associated with the second command. For example if the second command only narrowly "wins", then it may be determined not to implement the command fully.

According to some embodiments the value associated with the first command is obtained by using the relevance factor to modify the priority level value of the first command.

According to some embodiments the value associated with the first command is obtained by multiplying the priority level value of the first command with the relevance factor.

According to some embodiments the value associated with the first command and the value associated with the second command each comprise numerical values. Thus in some embodiments the determination of whether to execute the second command is based upon a comparison of two numerical values.

According to some embodiments the processor is arranged to execute the second command when the value associated with the second command is equal to or greater than the value associated with the first command. In some embodiments the second command is executed when the value associated with the second command is greater than the value associated with the first command. In such embodiments a command having a higher value is deemed to be more important. For example a command having a value of 1 is deemed to be more important than a command having a value of 0.

According to some embodiments the processor is arranged to execute the second command when the value associated with the second command is less than, or equal to or less than, the value associated with the first command. In such embodiments a command having a lower value is deemed to be more important. For example a command having a value of 0 is deemed to be more important than a command having a value of 1.

According to some embodiments, the priority level values are associated with a hierarchy of command priority level values.

According to some embodiments, the hierarchy of command priority levels is based upon resource types from which commands may be received. The resource types may also be considered as resource classes.

According to some embodiments, resource types from which commands may be received include: a user interface; a switch or dimmer; a sensor; automated control, which automated control may comprise script or a computer generated command.

According to some embodiments, commands from the user interface have a first priority level value, commands from the switch or dimmer have a second priority level value that is lower than the first priority level value, commands from the sensor have a third priority level value that is lower than the first and second priority level values, commands from the automated control have a fourth priority level value that is lower than the first, second and third priority level values. In other embodiments the hierarchy may be ordered in a different fashion. In this context a priority level value being "lower than" another priority level may also be considered to mean "less important than", rather than necessarily referring to a lower numerical value (although that alternative is of course also encompassed).

According to some embodiments, the hierarchy of command priority levels may be based upon user types from which commands may be received. The user types may include one or more of: a perceived importance of a user, a location of a user. For example an instruction received from a parent may be determined to be more important than an instruction received from a child. An instruction received from someone in the room whose illumination is being altered may be deemed more important than an instruction from someone outside the room.

In some embodiments the hierarchy may be based upon a combination of resource types and user types. For example the "user interface" hierarchy level may itself have a hierarchy of user types (e.g. parent/child) within that hierarchy level.

According to some embodiments, the processor determines to execute the second command only if it is received from a resource having the same or a higher priority level than a resource from which the first command was received. For example if the second command is from a resource have a third priority level, it will not override a command received from a resource having a first priority level. In some embodiments the processor determines to execute the second command only if it is received from a resource having the same priority level than a resource from which the first command was received. For example a second command received in response to a user pressing a switch will only be executed if the first command was also received in response to a user pressing a switch.

According to some embodiments, the relevance factor may vary over time. For example the relevance factor may reduce or diminish over time. Of course the reverse may also be true, whereby the relevance factor may increase over time. According to some embodiments the relevance factor may vary linearly over time. According to some embodiments the relevance factor may vary non-linearly over time.

According to some embodiments, the relevance factor of the first command may vary dependent upon a time elapsed since receiving the first command. To this end the relevance factor may be considered a time-based factor. A clock or timer may be started each time a command is received, and when a later or subsequent command is received a time elapsed since the previous or earlier command was received may be determined.

According to some embodiments, the relevance factor comprises a state-based property comprising one or more of: an intended application of the luminaires; the location of the luminaires; a time of day. For example where the state-based property comprises an intended application of the luminaire, this may take in to account what the lights are used for, for example whether that is ambient lighting, a warning light or alarm etc. Where the state-based property comprises a location of the luminaires, this may take in to account where the luminaires are located, for example in a bathroom or living room. Where the state-based property comprises a time of day this may take in to account a time of day at which the second command is received, and/or at what time of day the first command was received.

According to some embodiments the controller is arranged to store in its memory a history of one or more previous commands. For example the controller may store not just information on the "first" command, but also information on earlier commands. Using this information the controller may over time learn and adapt based on historical usage and information of the lighting system. This historical information may additionally or alternatively be stored externally from the controller. For example this information may also be stored in a memory of a sensor controlling lights in a room, which information can be obtained by the controller from the sensor on request. Therefore in some embodiments the controller is arranged to receive the history information from one or more sensors at the location, the one or more sensors also configured to store the history information.

According to a second aspect there is provided a method comprising: storing information, the information comprising a first illumination status of a location comprising one or more luminaires, and information of a first command causing the location to adopt the first illumination status; receiving a second command comprising an instruction for the at least one luminaire to illuminate the location in accordance with a second illumination status which differs from the first illumination status; and determining whether to execute the second command based upon a comparison between a value associated with the first command and a value associated with the second command, and calculating the value associated with the first command based upon a priority level value of the first command and a relevance factor associated with the first command, at a time of receiving the second command; and calculating the value associated with the second command based upon a priority level value of the second command.

According to a third aspect there is provided a computer program product comprising computer-executable code embodied on a non-transitory storage medium arranged so as when executed on one or more processing units to carry out the method steps according to the second aspect.

BRIEF DESCRIPTION OF FIGURES

Some embodiments of the invention are described in more detail below with respect to the following Figures in which.

DETAILED DESCRIPTION

Embodiments of the present invention will now be described in more detail with respect to the accompanying figures.

The embodiments describe a system that can be controlled from a plurality of sources. For example the lighting system can be controlled by a user (for example via one or more switches or an application or "app" on a user interface), indirectly controlled by a user (for example by use of a motion sensor), or automated control (for example based on a routine). In some embodiments the system may be considered a "stateless" system. The presence of multiple forms of control can at times make it difficult to provide complex behaviors. For example it may be the case that in some applications the system should only execute actions from a sensor when it is the sensor that has current "control" of the lighting system. The embodiments describe a lighting system whose behavior is conditional on who or what is deemed to be "in control".

Figure 1:
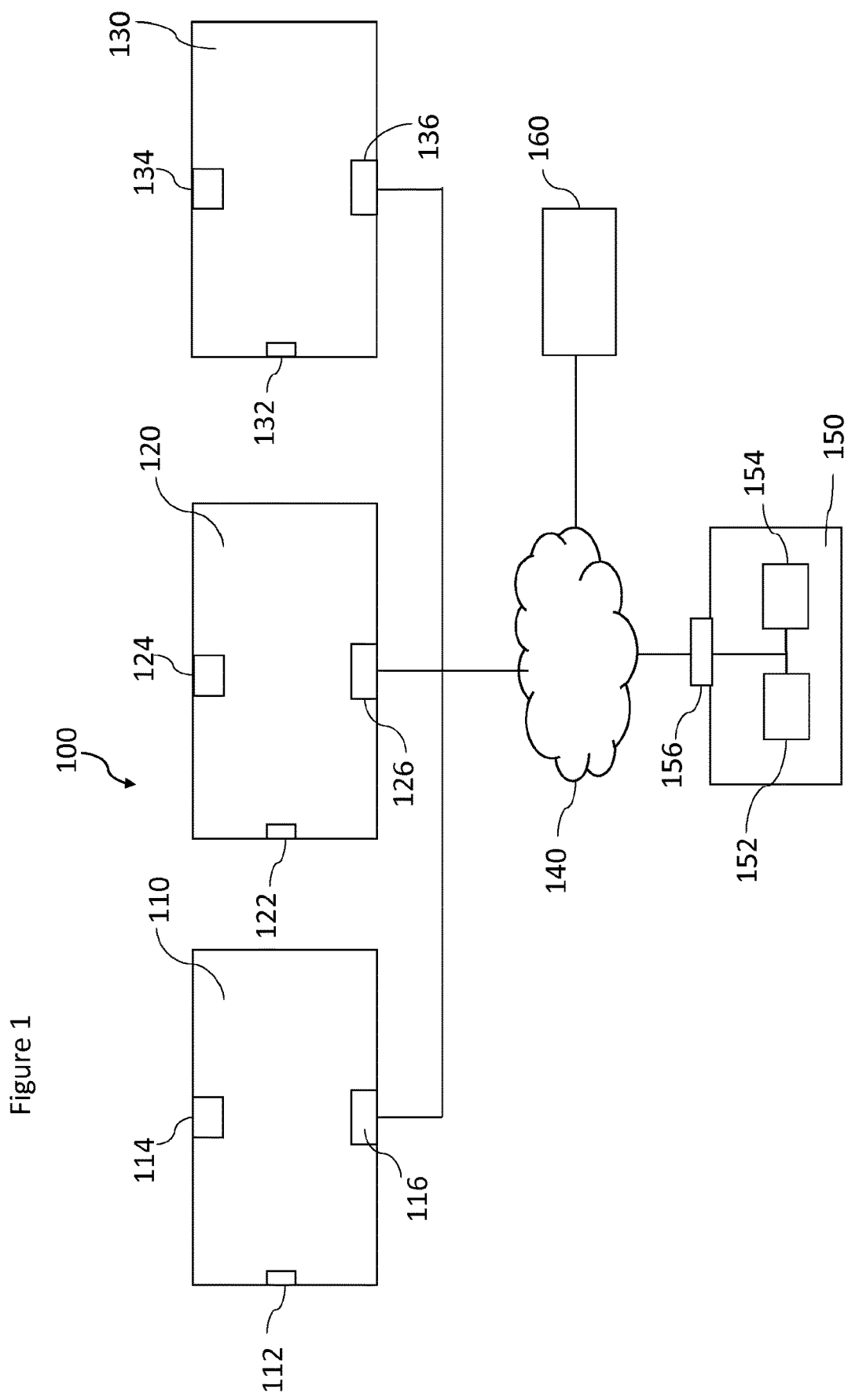
FIG. 1 shows an overview of a lighting system according to an embodiment.

FIG. 1 shows an example of a system 100 according to an embodiment. The system 100 is shown as comprising three locations 110, 120 and 130. This is of course by way of example only and other embodiments may include more or fewer locations. Therefore there may be considered to be one or more locations. The first location 110 comprises at least one control resource 112, and at least one luminaire 114 which may operate under the control of the control resource 112. For example the control resource 112 may comprise a switch or dimmer, or a sensor such as a motion sensor, or a light detector. The control resource 112 may also comprise a graphical user interface enabling a user to control the at least one luminaire 114 (and potentially also luminaires at another location). The control resource 112 may also be capable of controlling the at least one luminaire 114 without direct user input. For example the at least one luminaire 114 may be caused to operate according to a routine controlled by the control resource 112. For example the routine may specify times of day at which the luminaire 114 is to be switched on and off. In this example the first location 110 also comprises an interface 116 which is arranged to enable communication with a controller 150 via an interface 156 of the controller 150.

Although the control resource 112, at least one luminaire 114, and interface 116 are in FIG. 1 shown to be separate for the purpose of explanation, they can of course be combined or integrated in any manner. For example the interface 116 and control resource 112 may be part of a single unit. Whichever way they are combined or distributed, the control resource 112, at least one luminaire 114 and interface 116 may communicate with each other, for example by wired or wireless communication.

Similarly the second location 120 comprises a resource control 122, at least one luminaire 124, and an interface 126. The third location 130 comprises a control resource 132, at least one luminaire 134, and an interface 136. These elements operate in the same or a similar manner as those elements in the location 110. As briefly mentioned above a control resource can in some embodiments control the operation of luminaires in more than one location. For example, where the control resource 112 is a graphical user interface, a user may be able to use that graphical user interface 112 to not only control luminaires in the first location 110, but may also be able to control luminaires in the second and/or third locations 120 and 130.

The interface 116 at the first location 110 is communicatively connected to interface 156 of controller 150. In the embodiment of FIG. 1 this comprises a wireless (or at least partially wireless) interface via interface 140. For example interface 140 may be the Internet. The interface may exchange information according to any known current or future wireless protocols, such as Wi-Fi, 3G, 4G or 5G etc. The interfaces 126 and 136 are connected to interface 156 of controller 150 in a similar manner. Although the controller 150 is shown in FIG. 1 as a separate component of the system, it will be appreciated that this is by way of example only (although such embodiments are also encompassed). For example the controller 150 may be incorporated in any of control resource 112, at least one luminaire 114, and interface 116 (or their equivalents at the second and third locations).

The controller 150 comprises a memory 152 and a processor 154. The memory stores information. For example the memory 152 may comprise information of an illumination status or statuses of the one or more locations. This may include "current" and/or historical information. For example it may comprise information of whether the first location 110 currently has its lights switched on or off, or a level of brightness etc. The memory 152 may also store information such as information of commands, such as types of received commands. For example the information of a type of command may comprise information such as an origin of a command, such as whether that command was received from a user interface, or a switch, or a sensor, or is operating according to a predetermined routine etc. Such information may also be stored at the locations themselves (for example in resource controls 112, 122, 132) in addition to or alternatively to in the memory 152 of the controller 150.

Also schematically shown is a user device 160. The user device 160 is in communication with controller 150, and interfaces 116, 126, and 136 of the first, second and third locations respectively via wireless connection 140. Although not represented as such in FIG. 1, the user device 160 may for example be a graphical user interface located in one or more of the locations. Alternatively the user device 160 may be a device such as a mobile phone, tablet or laptop of the user. On such a user device 160 a user can control the luminaires of the one or more locations. For example a user may be able to switch the lights on and off, dim the lights, set routines for the lighting etc. In some embodiments the user interface is a graphical user interface that is downloadable as an application or "app".

Users may want illumination behavior to be controlled automatically in their lighting system. However, a user may also want to be able to regain control of their lighting system when required. Therefore, in at least some situations the intelligent or automatic behavior should cede control of the lighting system and grant control back to the user. Also, in some embodiments the automatic control should not then subsequently override the user behavior again (at least for a certain amount of time), as this may lead to a power struggle between the user and the system.

As a practical example, the first location 110 may be a bedroom of a user. In this example the user has set a wake up routine to occur at 7 am, in which case the lights are configured to automatically brighten at 7 am. However, the user wakes up early and manually switches on the lights at 06:50 am. In such a case the system may detect that the most recent action was performed by a user and therefore the automated trigger of the wake-up routine does not occur.

Similarly, a user may typically go to bed at 10 pm, and therefore has an automatic routine set for the lights in the bedroom to turn on at 9:30 pm. If the user decides to go to sleep early they may for example manually turn the lights off at 9:40 pm. In such a case the user will not want the automatic routine to override the manual switching off of the lights. Therefore in this case the user action takes precedence, and the automatic routine is (at least temporarily) cancelled.

In another example, the location 120 may be a living room of the user. When the user enters the living room, a motion sensor switches the lights on. The user then sits down to watch television and dims the lights to almost darkness. Since the user is sitting still, he is no longer detected by the motion sensor. The user may then move from one end of his sofa to the other to get more comfortable. In this case the motion sensor detects this movement, but the user may in fact not want the lights to be brightened at this point because he is still watching the television. Therefore in this case it may be that the motion sensor does not override the light settings that were set by the user.

Therefore, received commands may be prioritized to determine which command to follow. As explained in more detail below there is therefore provided by the present invention a lighting system (and controller therefore) that can compare input commands and control behavior of the lighting system accordingly.

Figure 2:
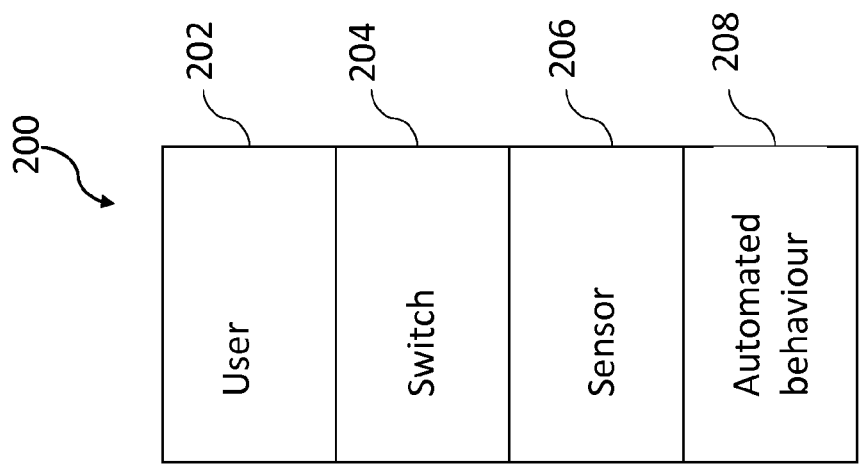
FIG. 2 schematically shows a hierarchy of resource types, according to an embodiment.

FIG. 2 shows a hierarchy of command categories shown generally at 200. A first command category, or priority level, is a "user" command shown at 202. These may be considered commands received directly from a user, for example via a graphical user interface. For example these may be commands received from a user interface of a user device 160 as shown in FIG. 1. The user in question may be in the room where the lights are being controlled. Alternatively, the user may be controlling the lights from a remote location. For example a user may wish to control the lights in their home whilst they are at work. These "user" commands may be considered to have a first priority level.

"Switch" commands are shown at 204. These may be considered commands received, for example, from a light switch or dimmer in a room in which the lights are located. The switch commands 204 have a second priority level that is lower than (i.e. deemed less important than) the first priority level of the user commands 202.

"Sensor" commands are shown at 206. These may be control commands based on a trigger from a sensing device. For example the sensing device may be a motion sensor, or a light sensor etc. The sensor commands 206 have a third priority level, which is lower than (i.e. deemed less important than) the second priority level of the switch commands 204 and lower than the first priority level of the user commands 202.

"Automated behavior" commands are shown at 208. These may be control commands from automated behavior that is programmed in to the system. For example these may be commands according to a schedule or routine e.g. turn lights on at 7 pm. These commands may be considered a piece of code controlling the system. The automated behavior commands have a fourth priority level which is lower than (i.e. less important than) the third, second and first priority levels.

The hierarchy of FIG. 2 is by way of example only and more or fewer levels of a hierarchy may be provided. The use of the term "first" to signify the highest (or most important) priority level is by way of example only, and in other examples the "first" priority level may be the lowest (or least important) priority level. The hierarchy may be dependent upon the number of command resources present in a system. For example some systems may only comprise hierarchy levels 202, 204 and 206 if that system does not have automated behavior functionality. Furthermore there may also be hierarchies within each level of the hierarchy. For example within the user level 202 certain users may take priority over other users. For example a command received from a parent may have a higher priority level within the hierarchy than a command received from a child. As a further example, if one user in a particular room in question (e.g. a room whose illumination status is subject to being changed) and another one elsewhere in the home or even outside of the home, the commands from the user in the room may get higher priority than the other users Likewise there may be more than one switch in a room, where one switch has a higher priority level than another switch. Of course, in other embodiments the ordering of the hierarchy may be different. In some embodiments the ordering of the hierarchy can be set and/or changed by a user.

According to some embodiments, the priority levels in the hierarchy may be assigned associated numerical values which can then be used when determining the importance of a command. By way of example only, a first priority level command (e.g. most important command), may be assigned a numerical value of 1, a second priority level command a value of 0.75, a third priority level command a value of 0.5, a fourth priority level a value of 0.25 etc. Of course this is by way of example only and different values may be used. In other embodiments relatively lower values are used to signify more important commands, and relatively higher values are used to signify less important commands.

According to embodiments, commands may also be assigned an associated relevance factor. The relevance factor may be considered a measure of how the importance of a received command should be perceived. The relevance factor may also be referred to as a weighting. In some embodiments the relevance factor may vary over time. For example the importance of a command can reduce over time. In some embodiments a most important command is given a relevance factor of 1, and a least important command is given a relevance factor of 0. A command can, for example, start off with a relevance factor of 1 and then decay over time to a relevance factor of 0. In some embodiments a relevance factor of 0 means that the command has effectively been forgotten or deleted by the system. To this end the relevance factor could also be considered a "forgetfulness" factor. Of course these values are by way of example only, and in other embodiments different values may be used. In other embodiments a value of the relevance factor may increase over time as that command is forgotten. For example a value of 0 may signify an initially important command, rising to 1 as that command is forgotten.

The relevance factor is useful in that it enables the system to be dynamic in determining whether an action should take place or not, rather than having a rigid set of hierarchical rules. Using the earlier example of a person entering a room where the lights are by default controlled by motion sensors, but are then overridden by a user dimming the light with a switch, then at the point at which the command is provided to dim the lights by the user then the relevance factor is high at that point in time for that command i.e. the system can make an assumption that since the user has manually dimmed the light then they will want the motion detection to be overridden for at least a certain period of time. However, the use of the relevance factor associated with the instruction enables an importance level of that instruction to vary over time. Say for example the user falls asleep on the sofa while watching television and wakes up five hours later wanting to leave the room. At that point the relevance of the instruction to dim the lights may have reduced to a point whereby a new command from the motion sensor overrides the user command, the result being that the motion sensor then causes the lights to brighten when the user moves.

The relevance factor can be calibrated dependent upon location and/or application. For example a relevance factor attributed to a manual input to switch lights off may diminish more slowly in a bedroom then in a living room or corridor. The relevance factor may also be adjusted for other attributes such as an intended application of the luminaires in normal operation, for example whether the luminaires are intended to provide low, ambient lighting in a restaurant or bright lighting in a workshop. The relevance factor may also be adjusted based on a time of day. Accordingly it will be understood that the relevance factor may be a time based property and/or a state based property. Although the embodiments have predominantly described the relevance factor as reducing over time, it will of course be understood that in some embodiments the relevance factor can increase over time.

Figure 3:
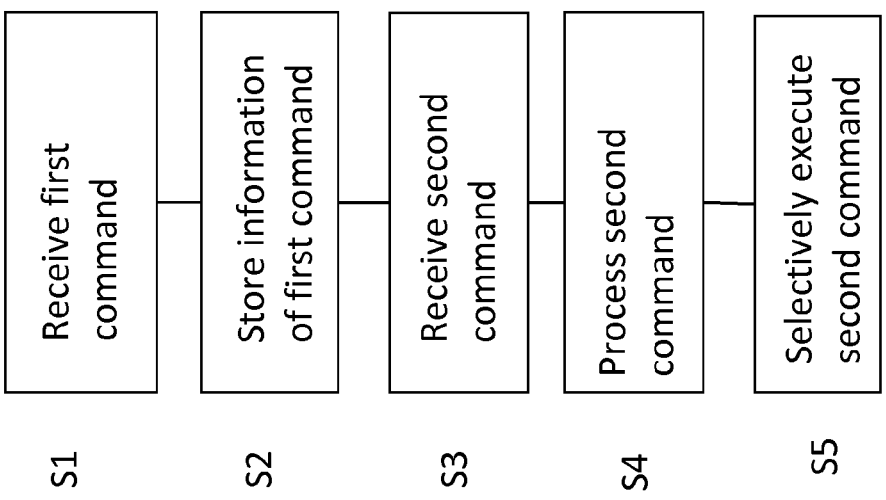
FIG. 3 shows an overview of a method, according to an embodiment.

A method according to an embodiment is shown at FIG. 3. This flowchart is viewed from the perspective of a controller controlling the lighting system.

At step S1 a first command is received. This may be a command to alter an illumination status of a location.

At step S2 information of this first command is stored. This information may comprise, for example, a time at which the first command was received, and a resource type from which the command was received. The relevance factor may also be associated with the command at this point.

Subsequently, at step S3 a second command is received. This second command may be a command to alter an illumination status of the location from the illumination status according to the first command.

At step S4 the second command is processed. This step comprises determining whether the second command should override the first command. For example this step may comprise comparing a value associated with the first command with a value associated with the second command.

Based on the outcome of step S4, the second command is selectively executed at step S5. Therefore if at step S4 it is determined that the second command should override the first command, then at step S5 the second command is executed. If on the other hand at step S4 it is determined that the second command should not override the first command, then at step S5 the second command is not executed.

The above example in FIG. 3 effectively describes a situation where the second command is either executed or ignored. It will be understood that in some embodiments a determination may be made to execute some, but not all, aspects of the second command. For example an embodiment may be considered where some elements of the command are allowed while others are ignored (e.g. color temperature command is rejected but brightness command is accepted so the later command_can_adjust the brightness but not override the set color temperature (for example so that the circadian rhythm is not disturbed). In another example a user sets a certain scene. Later routine commands (for circadian rhythm) have brightness and color temperature elements. The brightness of those commands may be ignored while the color temperature is executed, so that a circadian rhythm effect is obtained while the user-set brightness is maintained. Another non-binary control would be that the command is partly executed. For example the lights may be at 100% (i.e. full brightness). The "off" command is not fully executed but only half so brightness dims to 50%. The implemented percentage may be linked to the (inverse of the) forgetfulness curve discussed later (see FIGS. 7A to 7C). Likewise commands can be "ignored" in a non-binary manner.

Figure 4:
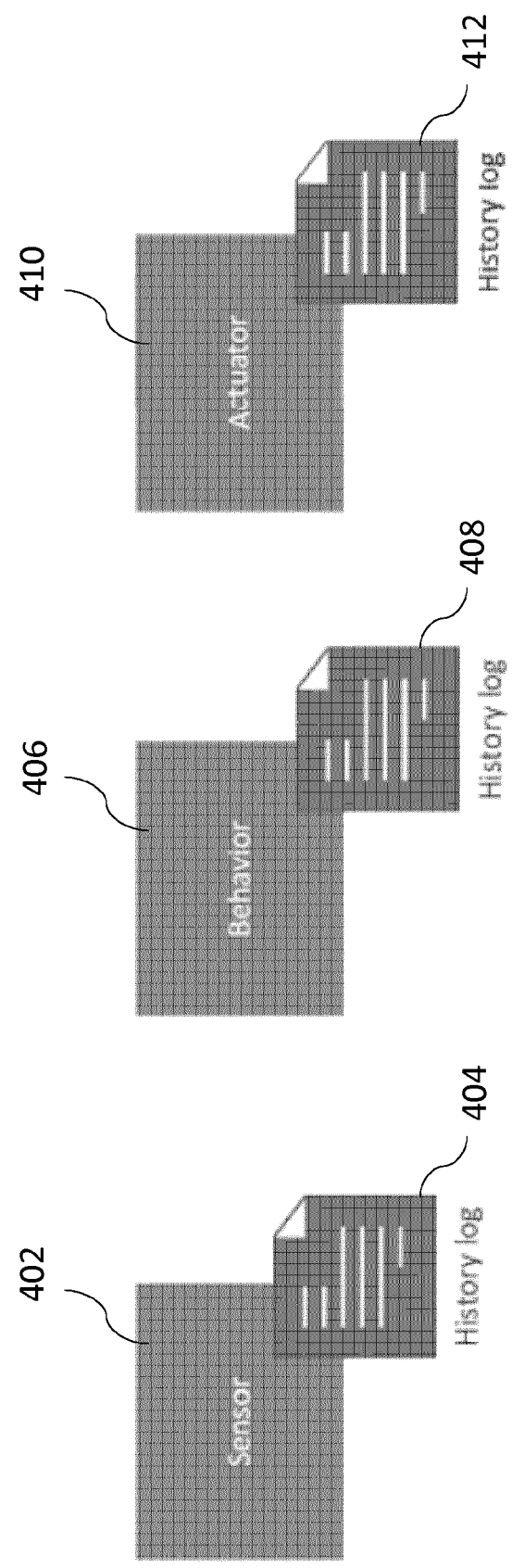
FIG. 4 shows history logs associated with various resource types, according to an embodiment.

As mentioned above, a history of previously received commands may be stored. This is schematically shown in FIG. 4. In the example of FIG. 4 each type of resource has an associated history log. Therefore in this example "sensor" commands 402 have an associated history log 404. Sensor type commands may include for example commands received from a motion sensor. Therefore the history log 404 may store information each time motion is detected. Behavior type commands are shown at 406, and have an associated history log 408. Behavior type commands may for example comprise commands received according to a routine or schedule, or other types of automated behavior. For example history log 408 may comprise a log of each time lights are turned on and off according to an automated routine. Actuator type commands are shown at 410, which has an associated history log 412. The history log 412 may recall incidences of actuator based commands, for example commands from one or more users turning the light switches on and off. FIG. 4 is of course by way of example only, and the history logs may be structured in other ways. For example a single history log may record information relating to a number of resource control types.

Figure 5:
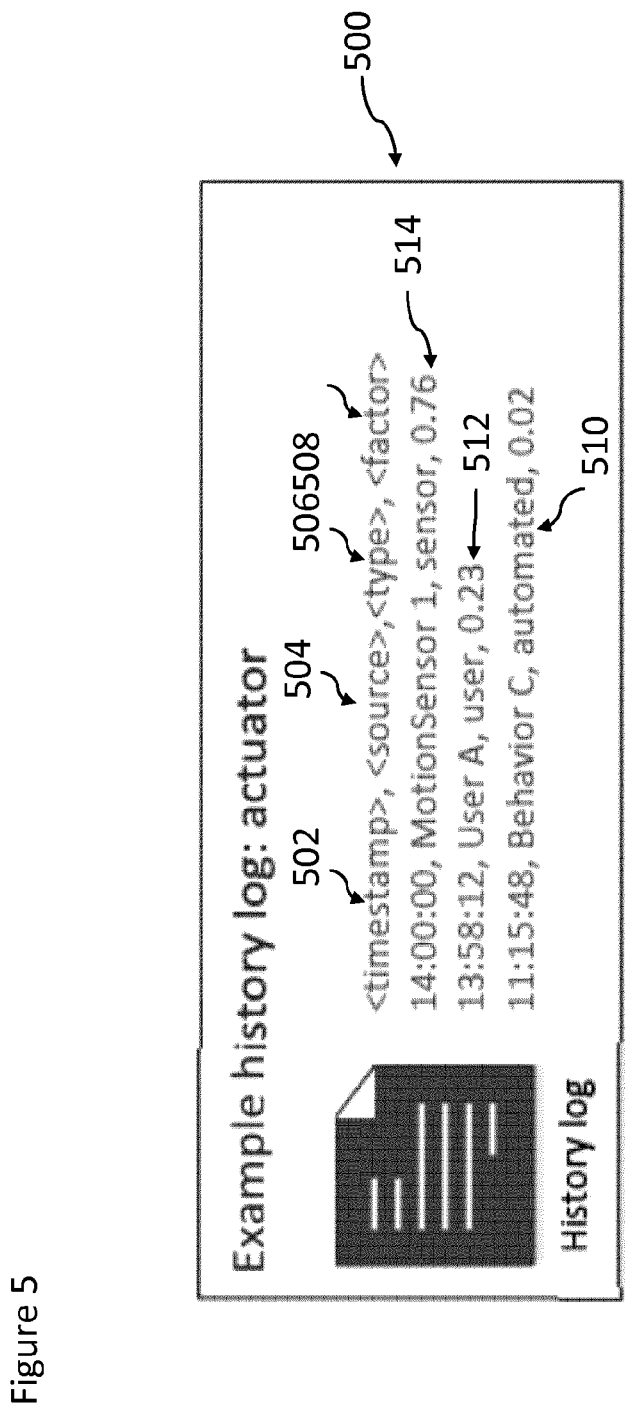
FIG. 5 shows a history log according to an embodiment.

An example history log 500 is shown in more detail with respect to FIG. 5. The example history log 500 records a time stamp 502 of a time at which a command is received. The history log also records a source of the command 504. This may for example comprise an indication of an identity of a resource from which the command is received. For example this attribute may enable an identity of a specific resource to be recorded, which enables a distinction to be made between commands received from different resources that are of the same type. For example it enables identification of a particular switch within a room to be identified, even if there is a plurality of switches in the room.

Information is also stored as to a "type" of command 506. This records for example a type of resource from which a command was received. For example it may store information of whether the command was received from a user or a sensor.

The history log also records a "factor" of the command 508. In embodiments this "factor" comprises the relevance factor or forgetfulness factor discussed above. This factor provides a value of how important a particular command is deemed to be. As mentioned, this value may vary over time.

Using the example of FIG. 5, information of a first command is generally shown at 510. This command has a timestamp of 11:15:48. The "source" of the behavior is "Behavior C". Behavior C may be a certain type of behavior, such as "lights dimmed". The "type" of command 506 is "automated" i.e. following a pre-programmed routine. The factor 508 or relevance factor of this command is 0.02. In this case the relevance factor may have diminished to the relatively low value of 0.02 because the command was received a relatively long time ago.

A second command is shown generally at 512. This command has a timestamp of 13:58:12. The source of the command 504 is "User A". This may be a particular person within a group of people. The identity of the person may for example be determined from an identity of a device (such as a mobile device) from which the command was received. The type of command 506 is "user", and in this example the command has a factor 508 or relevance factor of 0.23. Different users e.g. "User B" and "User C" etc. may have different relevance factors associated with their identities (and which relevance factors may vary at different rates).

A third command is shown generally at 514. The third command 514 has a timestamp of 14:00:00. The source of the command is "MotionSensor 1". The type of command is "Sensor", and in this example the command has a factor 508 or relevance factor of 0.76. It will be understood from this example that in embodiments commands from different sensors can be identified or distinguished by logging the identity of the sensor. According to the embodiments different motion sensors may have different relevance factors associated therewith.

In some embodiments the history logs can also be used to provide a user with an overview of what has happened in the system. For example lights may have turned on in the system, and the user doesn't understand why. The user can then review the history log to obtain an explanation. For example the history log may be able to tell the user that motion sensor behavior turned the lights on, or that light-level detection turned the lights on (e.g. sunset behavior). The user may be able to view such information on a graphical user interface, for example at a centralized controller or by an app on a mobile device or computer.

Figure 6:
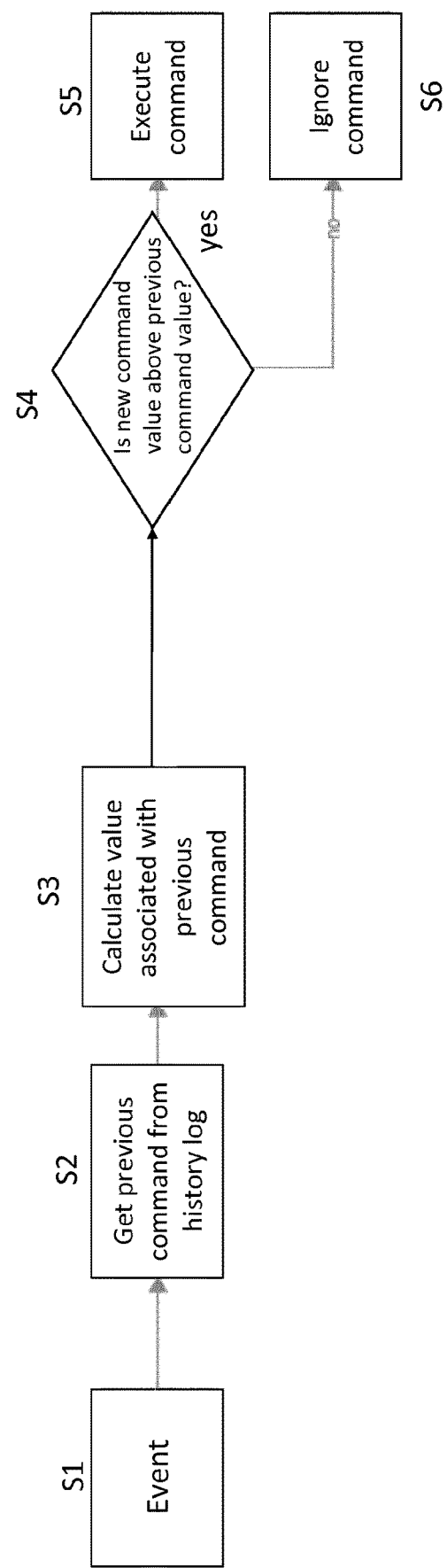
FIG. 6 shows a flow chart of a method, according to an embodiment.

FIG. 6 shows a more detailed flowchart in accordance with an embodiment. This flowchart shows in more detail how the commands may be compared in order to determine whether or not to execute a new command.

At step S1 an "event" occurs. This event may be, for example, a new command being received for altering an illumination level of a luminaire. This new command may be considered a "second" command.

In response to receiving the new command, at step S2 the previous command is retrieved from the history log. The previous command may be considered a "first" command.

At step S3 a value associated with the first command is calculated. The value associated with the first command may be considered a weight of the first command. The value associated with the first command is calculated based upon a priority level value of the first command, and a relevance factor associated with the first command at a time of receiving the second command. The priority level value of the first command is based upon the hierarchy of command priority levels. In some embodiments the priority level value of the first command is multiplied with the relevance factor of the first command to obtain the value associated with the first command.

At step S4 a comparison is made between the value associated with the previous command calculated at step S3, and a value associated with the new command. In other words a weight of the previous command is compared with a weight of the new command. In embodiments the value associated with the new command is based upon a priority level value of the new command. The priority level value is based upon the hierarchy of command priority levels. In some embodiments, the comparison between the value associated with the previous command and the value associated with the new command comprises a determination of whether the value associated with the new command is above the value associated with the previous command. In other embodiments the determination may be whether the value associated with the new command is equal to or greater than the value associated with the previous command. Of course, in other embodiments where a lower value signifies a more important command then a determination of whether to execute the new command may be based on whether the value associated with the new command is less than, or equal to or less, than the value associated with the previous command If the answer at step S4 is "yes", then the process proceeds to step S5 where the new command is executed.

If the answer at step S4 is "no", then the new command is ignored.

As discussed above the implementation of the new command (or indeed the implementation of the "ignoring" thereof) may be carried out in a non-binary manner.

Although in this embodiment the new (or "second") command is compared only to the previous (or "first") command, in other embodiments the system can look at a previous number of commands (e.g. the previous "x" commands), or previous commands within a given time frame.

For further explanation a practical example is now given.

At time t1 a command is received from a switch to turn a light off. This first command has a nominal priority level value of 0.75 (by way of example), based upon the hierarchy of priority levels. A relevance factor is associated with this command. The invention is not limited to a particular time at which the relevance factor is associated with the command. For example the relevance factor may be associated with the first command at the time the first command is received. Alternatively the relevance factor may be associated with the command when the command is retrieved from the history log (e.g. at step S2 in FIG. 6). As explained above the relevance factor may vary over time. For example the relevance factor may initially be given a value of 1 (by way of example only), and diminish over time.

At time t2 a second command is received. This command is received from a sensor, for example a motion sensor sensing motion in the room. This second command has a nominal priority level value of 0.5 (by way of example). In order to decide whether to execute the second command, the first command is retrieved from the history log. At time t2 the relevance factor of the first command has diminished to 0.5, and the value associated with the first command (or weight of the first command) can be calculated by multiplying the relevance factor with the priority level value. In this example the calculation is 0.75*0.5=0.375. Therefore at time t2 the value associated with the second command (0.5) is higher than the value associated with the second command (0.375), and therefore the second command is executed.

So in summary each command is given a priority. Higher priorities are deemed more important. A new incoming command is only executed when the priority value is higher (deemed more important) than the current value of the previous command. The value of the previous command may reduce over time. The computation for this time factor can be dependent on contextual settings. By default this factor may simply be reduced linearly. However, this computation can also be adjusted so there is a fast drop at the beginning and slower drop at the end. This can be useful in for example a hallway where the user does not stay for a long period and commands can be 'forgotten' relatively quickly. Commands may also be forgotten 'slowly', or relatively slowly which may be useful for spaces where a user stays for an extended period of time, such as a living room or a bedroom.

Therefore it may be considered that the relevance factor (or weight factor or forgetfulness factor) may vary over time. In some embodiments the relevance factor reduces over time. The variation may be linear or non-linear. Where the variation is non-linear the rate of reduction or decay may be faster at the start than at the end, or vice-versa, dependent on context such as location for example.

Figure 7B:
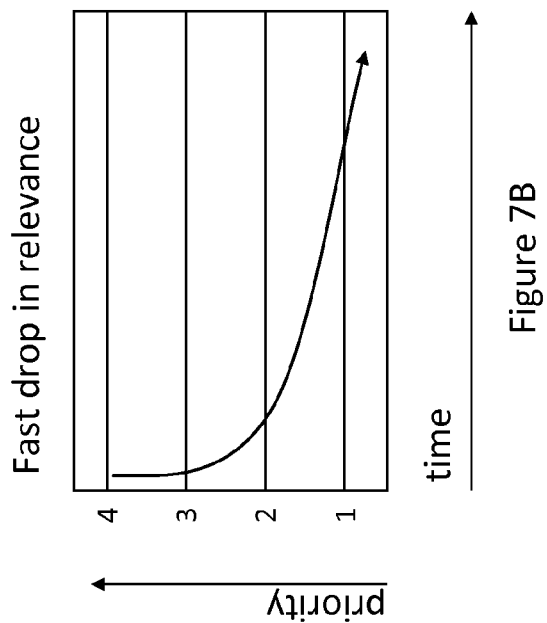
FIGS. 7A to 7C are graphs giving examples of the relevance factor varying over time
Figure 7A:
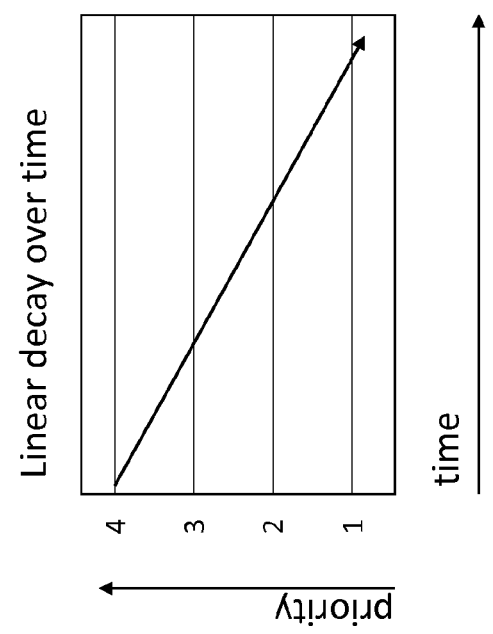
Figure 7C:
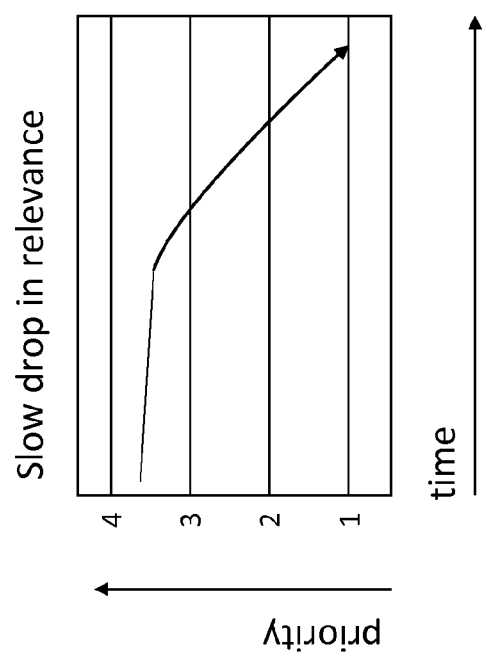

This is further explained in FIGS. 7A to 7C which show how a priority value of a command (i.e. a value associated with a command) can vary over time, based on the changing (e.g. decaying) relevance factor. Again, the numerical values provided in these Figures are by way of non-limiting example.

FIG. 7A shows an example where the "priority" value (e.g. value associated with a command) linearly decays over time.

FIG. 7B shows an example where the priority value initially decays relatively quickly, and then subsequently decays more slowly.

FIG. 7C shows an example where the priority value initially decays quite slowly, and subsequently decays relatively quickly.

Figure 8:
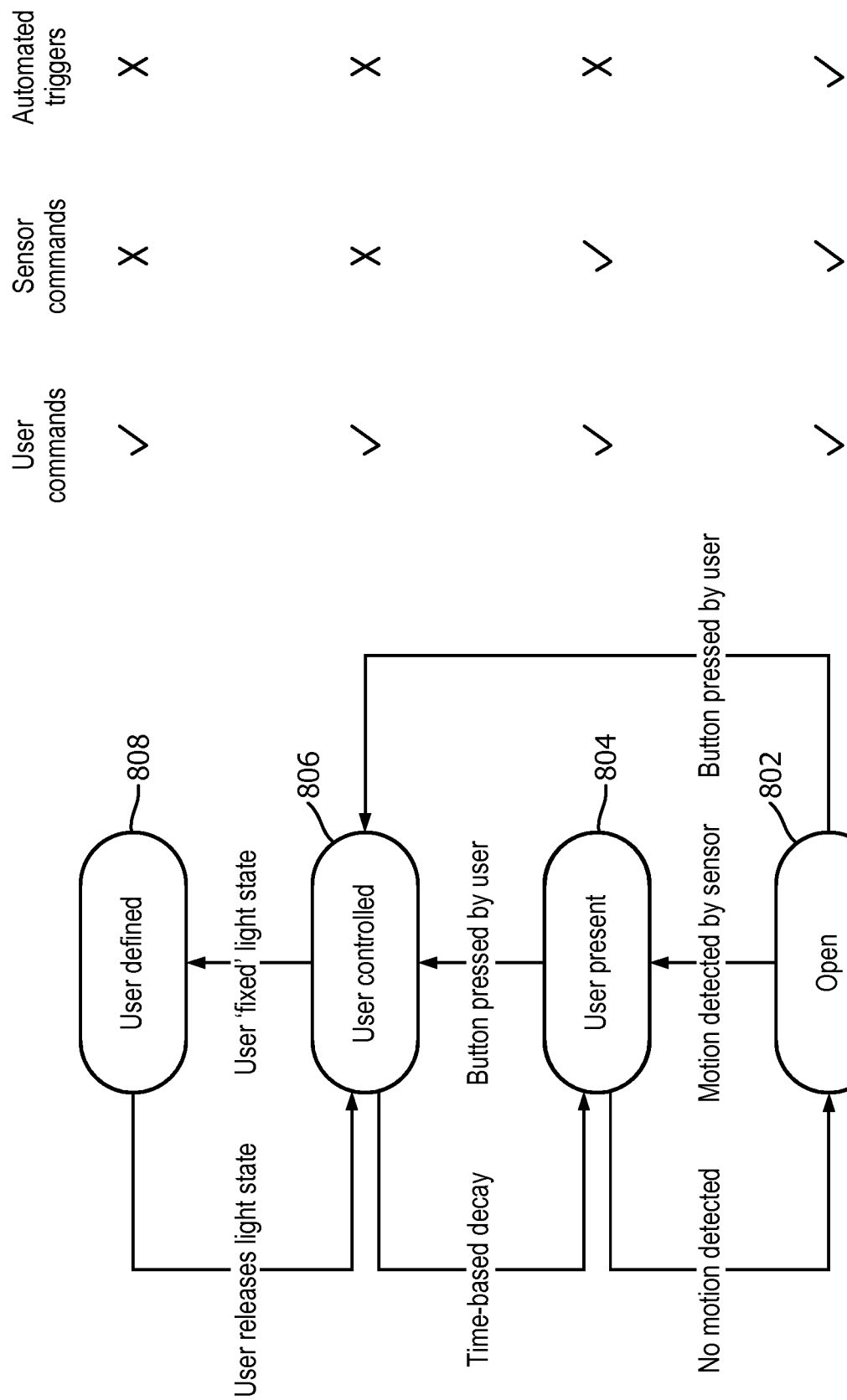
FIG. 8 shows a more advanced hierarchy, according to an embodiment.

FIG. 8 shows a more detailed hierarchy diagram, in accordance with some embodiments. A first or "open" level is shown at 802. This may be considered a baseline level or steady state of a lighting system. Level 804 of the hierarchy is a higher level in which a user is present in the location being illuminated. Level 806 is a higher level again, referred to as a "user controlled" level. In this example level 808 is the highest level of the hierarchy, referred to as a "user defined" level. Each level of the hierarchy may be considered a state or status of the hierarchy or system.

It can be appreciated from FIG. 8 how a room or location can move between different states. For example a room may initially be in an open state i.e. level 802. If a user enters the room, then that motion may be detected by a sensor, and the system is then placed in the user present state i.e. level 804 of the hierarchy. If a button, for example a light switch, is then pressed in the room the room then moves to the user controlled state in the hierarchy. Following on from this if a user then defines a new illumination setting, for example via an app on their mobile device or on a user interface of a centralized control, then the system moves to the user-defined state 808. Of course, the system can move between states by more than one step at a time. For example, if the system is in the open state 802 and a button or light switch is pressed by a user in the room, then the system will move to the user controlled state 806. The hierarchy diagram FIG. 8 also shows how the status of the system can move down the hierarchy. For example if a room is in the user defined state 808, and the user then releases the room from a current light state, then the state will move down to the user controlled state 806. If nothing happens for a period of time then the system may move down to the user present state 804, following a time based decay. If there is then no motion detected, the system may move down to the open state 802. Of course the state of the system can also move down the hierarchy by more than one step at a time. For example a user can cause the system to move from the user defined state 808 straight down to the open state 802.

The ticks and crosses on the right hand side of FIG. 8 signify the type of resource commands which will be executed at each level. For example, at the open level 802 any of a user command, sensor command, or automated trigger can cause the system to change state. Conversely, at the user defined state 808, only a user command can cause the system to change state. Therefore depending on a type of action that is performed and a "current" state of the system a higher or lower state can be reached. Based on the state of the system some categories of commands can be ignored, and new actions can change the state of the system again.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller for controlling a lighting system, the controller comprising:
    an interface arranged to communicate with one or more luminaires at a location to be illuminated;
    a memory arranged to store information, the information comprising a first illumination status of the location, and information of a first command causing the location to adopt the first illumination status;
    the interface further arranged to receive a second command comprising an instruction for the at least one luminaire to illuminate the location in accordance with a second illumination status which differs from the first illumination status;
    and a processor configured to determine whether to execute the second command based upon a comparison between a value associated with the first command and a value associated with the second command,
    the processor configured to calculate the value associated with the first command based upon a priority level value of the first command and a relevance factor associated with the first command, at a time of receiving the second command, wherein the relevance factor of the first command varies dependent upon a time elapsed since receiving the first command; and
    the processor configured to calculate the value associated with the second command based upon a priority level value of the second command,
    wherein the priority level values of the first and second commands are associated with a hierarchy of command priority level values, the hierarchy of command priority level values being based upon resource types from which commands may be received, the resource types including: a user interface; a switch or dimmer; a sensor; or automatic control.

2. The controller as set forth in claim 1, wherein the value associated with the first command is obtained by using the relevance factor to modify the priority level value of the first command.

3. The controller as set forth in claim 2, wherein the value associated with the first command is obtained by multiplying the priority level value of the first command with the relevance factor.

4. The controller as set forth in claim 1, wherein the processor is arranged to execute the second command when the value associated with the second command is equal to or greater than the value associated with the first command.

5. The controller as set forth in claim 1, wherein the processor is arranged to execute the second command when the value associated with the second command is equal to or less than the value associated with the first command.

6. The controller as set forth in claim 1, wherein the controller is arranged to store in its memory a history of previous commands.

7. The controller of claim 1, wherein the interface is configured to receive the first command and the second command from the same user.

8. The controller of claim 1, wherein the relevance factor of the first command decreases as time progresses.

9. A method comprising:
storing information, the information comprising a first illumination status of a location comprising one or more luminaires, and information of a first command causing the location to adopt the first illumination status;
receiving a second command comprising an instruction for the at least one luminaire to illuminate the location in accordance with a second illumination status which differs from the first illumination status; and
determining whether to execute the second command based upon a comparison between a value associated with the first command and a value associated with the second command, and
calculating the value associated with the first command based upon a priority level value of the first command and a relevance factor associated with the first command, at a time of receiving the second command, wherein the relevance factor of the first command varies dependent upon a time elapsed since receiving the first command; and
calculating the value associated with the second command based upon a priority level value of the second command,
wherein the priority level values of the first command and second commands are associated with a hierarchy of command priority level values, the hierarchy of command priority levels being based upon resource types from which commands may be received, the resource types including: a user interface; a switch or dimmer; a sensor; or automated control.

10. A non-transitory computer readable medium comprising computer-executable instructions that when executed on one or more processing units perform the method steps according to claim 9.

* * * * *